United States Patent
Karlsson

(10) Patent No.: US 9,945,518 B2
(45) Date of Patent: Apr. 17, 2018

(54) METHOD AND ARRANGEMENT FOR TRANSFERRING HEAT IN A GASEOUS FUEL SYSTEM

(71) Applicant: WARTSILA FINLAND OY, Vaasa (FI)

(72) Inventor: Soren Karlsson, Solf (FI)

(73) Assignee: Wartsila Finland OY, Vassa (FI)

( * ) Notice: Subject to any disclaimer, the term of this patent is extended or adjusted under 35 U.S.C. 154(b) by 212 days.

(21) Appl. No.: 15/036,007

(22) PCT Filed: Nov. 11, 2013

(86) PCT No.: PCT/FI2013/051063
§ 371 (c)(1),
(2) Date: May 11, 2016

(87) PCT Pub. No.: WO2015/067842
PCT Pub. Date: May 14, 2015

(65) Prior Publication Data
US 2016/0281931 A1    Sep. 29, 2016

(51) Int. Cl.
*F17C 9/02* (2006.01)
*F17C 9/04* (2006.01)
*F02M 21/02* (2006.01)
*F02M 21/06* (2006.01)

(52) U.S. Cl.
CPC ........... *F17C 9/04* (2013.01); *F02M 21/0215* (2013.01); *F02M 21/0221* (2013.01);
(Continued)

(58) Field of Classification Search
CPC ...... F02M 21/0215; F02M 21/06; F17C 9/04; F17C 2223/0153; F17C 2223/03; F17C 2223/0161; F17C 2223/041; F17C 2223/035; F17C 2205/0323; F17C 2227/0316; F17C 2260/011; F17C 2260/042; F17C 2223/046; F17C 2205/0326; F17C 2250/0439; F17C 2270/0105; F17C 2250/0631; F17C 2205/0111; F17C 2227/0107; F17C 2227/037; F17C 2227/033; F17C 2227/0374; F17C 2227/0323;
(Continued)

(56) References Cited

U.S. PATENT DOCUMENTS

| 2,903,860 A * | 9/1959 | Brown ...................... F17C 9/00 |
| | | 114/74 A |
| 2005/0061002 A1 | 3/2005 | Nierenberg |
| 2011/0146605 A1 | 6/2011 | Dixon et al. |

FOREIGN PATENT DOCUMENTS

CA    2 653 643 A1    5/2009

* cited by examiner

*Primary Examiner* — Len Tran
*Assistant Examiner* — Ana Vazquez
(74) *Attorney, Agent, or Firm* — Muncy, Geissler, Olds & Lowe, P.C.

(57) ABSTRACT

A fuel storage and distribution system for a gas-fueled sea-going vessel includes a thermally insulated gas tank for storing liquefied gas fuel. A local heat transfer circuit is configured to extract heat from an external heat source circuit. As a part of said local heat transfer circuit a heating arrangement is configured to heat gas fuel for increasing pressure inside the gas tank. As a part of said local heat transfer circuit is a main gas evaporator for evaporating liquefied gas fuel drawn from the gas tank for delivery to an engine of the sea-going vessel.

10 Claims, 7 Drawing Sheets

(52) U.S. Cl.
CPC ......... *F02M 21/06* (2013.01); *F17C 2203/03* (2013.01); *F17C 2203/0391* (2013.01); *F17C 2205/0111* (2013.01); *F17C 2205/0323* (2013.01); *F17C 2205/0326* (2013.01); *F17C 2205/0355* (2013.01); *F17C 2221/033* (2013.01); *F17C 2223/0153* (2013.01); *F17C 2223/0161* (2013.01); *F17C 2223/035* (2013.01); *F17C 2223/041* (2013.01); *F17C 2223/046* (2013.01); *F17C 2227/0107* (2013.01); *F17C 2227/0309* (2013.01); *F17C 2227/0316* (2013.01); *F17C 2227/0323* (2013.01); *F17C 2227/0327* (2013.01); *F17C 2227/0332* (2013.01); *F17C 2227/0372* (2013.01); *F17C 2227/0374* (2013.01); *F17C 2227/0379* (2013.01); *F17C 2250/032* (2013.01); *F17C 2250/043* (2013.01); *F17C 2250/0408* (2013.01); *F17C 2250/0439* (2013.01); *F17C 2250/0491* (2013.01); *F17C 2250/0631* (2013.01); *F17C 2250/0636* (2013.01); *F17C 2260/011* (2013.01); *F17C 2260/042* (2013.01); *F17C 2265/066* (2013.01); *F17C 2270/0105* (2013.01); *Y02T 10/32* (2013.01)

(58) Field of Classification Search
CPC ...... F17C 2227/0309; F17C 2227/0327; F17C 2250/0408; F17C 2250/043; F17C 2250/03; F17C 2250/0491; F17C 2250/0636; F17C 2265/066; F17C 2221/033; F17C 2203/0391; F17C 2203/02; Y02T 10/32

See application file for complete search history.

METHOD AND ARRANGEMENT FOR TRANSFERRING HEAT IN A GASEOUS FUEL SYSTEM

TECHNICAL FIELD

The invention concerns in general systems that are used onboard sea-going vessels to supply engines with gaseous fuel. Especially the invention concerns a method and an arrangement for transferring heat to selected locations where liquefied gaseous fuel is heated and/or evaporated.

BACKGROUND OF THE INVENTION

Natural gas, or in general mixtures of hydrocarbons that are volatile enough to make the mixture appear in gaseous form in room temperature, constitutes an advantageous alternative to fuel oil as the fuel of internal combustion engines. In sea-going vessels that use natural gas as fuel, the natural gas is typically stored onboard in liquid form, giving rise to the commonly used acronym LNG (Liquefied Natural Gas). Natural gas can be kept in liquid form by maintaining its temperature below a boiling point, which is approximately −162 degrees centigrade (−260 degrees Fahrenheit). Natural gas can be also stored for use as fuel by keeping it compressed to a sufficiently high pressure, in which case the acronym CNG (Compressed Natural Gas) is used. This description refers mainly to LNG because liquefying is considered more economical than compressing at the time of writing this text.

FIG. 1 illustrates schematically the architecture of a known system onboard an LNG-fuelled vessel. An LNG bunkering station 101 is located on the deck and used to fill up the system with LNG. The LNG fuel storage system comprises one or more thermally insulated gas tanks 102 for storing the LNG in liquid form, and the so-called tank room 103 where the LNG is controllably evapo-rated and its distribution to the engine(s) is arranged. Evaporation means a phase change from liquid to gaseous phase, for which reason all subsequent stages should leave the L for liquefied out of the acronym and use only NG (Natural Gas) instead.

The engine 104 or engines of the vessel are located in an engine room 105. Each engine has its respective engine-specific fuel input subsystem 106, which in the case of gaseous fuel is in some sources referred to as the GVU (Gas Valve Unit). The tank room 103 of FIG. 1 comprises two evaporators, of which the first evaporator 107 is the so-called PBU (Pressure Build-Up) evaporator used to maintain a sufficient pressure inside the gas tank 102. Internal hydrostatic pressure at the inlet of a main supply line 108 inside the gas tank 102 is the driving force that makes the LNG flow into the second evaporator 109, which is the MGE or Main Gas Evaporator from which the fuel is distributed in gaseous form towards the engines. In order to ensure that evaporated gas flows to the GVU(s) and further to the engine(s) at sufficiently high pressure, the PBU system maintains the internal pressure of the gas tank 102 at or close to a predetermined value, which is typically between 5 and 10 bars.

The engine 104 comprises one or more cooling circuits. Schematically shown in FIG. 1 is an external loop 110 of the so-called low temperature (LT) cooling circuit, which may be used for example to cool lubricating oil. The so-called LT water that circulates in the external loop 110 may have a temperature around 50 degrees centigrade when it goes through a heat exchanger 111, in which it donates heat to a mixture of glycol and water that in turn transfers heat to the evaporators 107 and 109. The glycol/water mixture circuit comprises a circulation pump 112 and an expansion tank 113. Glycol is needed in the mixture to prevent it from freezing when it comes into contact with the extremely cold LNG inlet parts of the evaporators 107 and 109.

The heat and fluid flows in the system of FIG. 1 are schematically illustrated in FIG. 2. LNG flows from the gas tank 102 into a PBU evaporation circuit 201 and an MGE evaporation circuit 202 that are located in the tank room 103. Heat originates from combustion (and from friction) in the engine 104, and gets transferred from the cooling water circuit 110 to the glycol/water mixture circuit 203, which in turn donates heat to the PBU and MGE evaporation circuits 201 and 202. Both of these produce gas, which in the case of the PBU evaporation circuit is led back to the gas tank 102 and in the case of the MGE evaporation circuit to the engine 104.

FIG. 3 is a slightly different schematic representation but illustrates essentially the same parts of the evaporation circuits as FIG. 1: a gas tank 102, a PBU evaporator 107, and an MGE evaporator 109. The pipes 301 and 302 on the right are the incoming and outgoing pipes of the glycol/water mixture circuit respectively.

Drawbacks of the prior art approach illustrated in FIGS. 1 to 3 include a relatively complicated structure, which requires a relatively long assembling time at the shipyard when a gas-fuelled sea-going vessel is built and causes relatively high manufacturing costs. Another disadvantageous characteristic is the relatively large number of pipes in which extremely cold LNG flows—an unexpected mechanical failure might allow the cold liquefied gas to flood the tank room and/or its surroundings.

In publication CA 2653643 discloses a pressure control system comprising separate conduits for supplying liquefied gas and vapor from a cryogen space defined by a cryogenic storage tank, in which a heat exchanger(s) with a source of heat for both evaporating the gas for engine and building pressure in the tank is used.

In publication US 2011/146605 discloses a liquefied natural gas system for a natural gas vehicle engine with flow driven by the engine includes dual flow paths through at least one heat exchanger, in which the heat exchanger(s) with a source of heat for both evaporating the LNG for engine and building pressure in the tank is used.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to an aspect of a present invention there is provided a fuel storage and distribution system for a sea-going vessel, which enables cutting manufacturing costs and constructional complexity in comparison to prior art systems. According to another aspect of a present invention there is provided a fuel storage and distribution system that enables saving time in the construction of a gas-fuelled sea-going vessel. According to yet another aspect of the invention there is provided a method for maintaining the pressure in a gas tank of a gas-fuelled sea-going vessel, by utilizing all the advantages of the system described above.

Advantageous objectives of the invention are achieved by drawing a part of an external heat source circuit, such as for example an engine cooling circuit, up to the tank room, and using a local heat transfer circuit in the tank room to transfer heat from the external heat source circuit to the gas fuel. The latter part can be done either directly or indirectly. In an indirect implementation the local heat transfer circuit heats a fluid heating medium that flows in a closed loop through parts of the gas tank. A direct implementation means that the contents of the local heat transfer circuit heat the gas fuel, either so that they circulate in a closed loop through the gas tank or so that gas fuel drawn from the gas tank goes through an evaporator or heat exchanger in the tank room.

Evaporation and condensation are very effective ways of transferring heat, in the sense that the structural elements within which the actual transfer of heat from one substance to another takes place can be made physically relatively small. The use of evaporation and condensation also allows using gravitational forces effectively: the density of an evaporated medium is much smaller than that of the same substance in liquid phase, so the gaseous phase always finds its way to the highest part of the circulation, making circulation pumps unnecessary. For these reasons it is advantageous to build the local heat transfer circuit (and the additional closed loop for heating medium, if an indirect implementation is made) so that they comprise appropriate condensers and re-boilers.

The invention makes it possible to get completely rid of the glycol/water mixture circulation that was considered necessary in prior art systems. Constructing a sea-going vessel becomes more streamlined as a process, because one complete subsystem can be eliminated. The parts of the fuel storage and distribution system, comprising the gas tank(s) and the tank room(s), can be manufactured separately and delivered to the shipyard as a module, so that only a pipeline to an external heat source circuit like the cooling circuit of the engine needs to be added at the shipyard. Circulation pumps, expansion tanks, and other parts of the previously used glycol/water mixture circulation are not needed at all.

The exemplary embodiments of the invention presented in this patent application are not to be interpreted to pose limitations to the applicability of the ap-pended claims. The verb "to comprise" is used in this patent application as an open limitation that does not exclude the existence of also unrecited features. The features recited in depending claims are mutually freely combinable un-less otherwise explicitly stated.

The novel features which are considered as characteristic of the invention are set forth in particular in the appended claims. The invention itself, however, both as to its construction and its method of operation, together with additional objects and advantages thereof, will be best understood from the following de-scription of specific embodiments when read in connection with the accompanying drawings.

DETAILED DESCRIPTION OF EMBODIMENTS OF THE INVENTION

Figure 1:
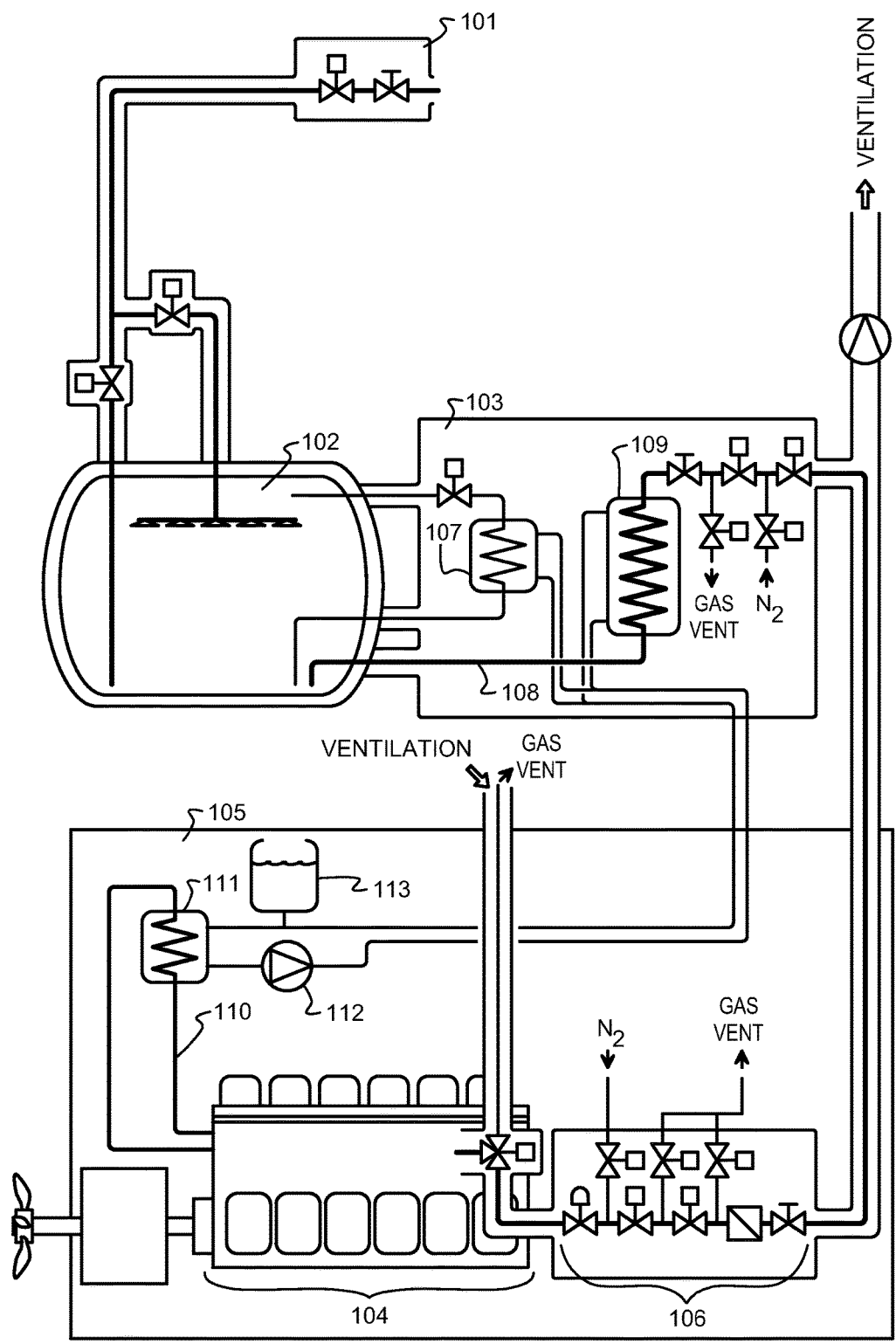
FIG. 1 illustrates a prior art LNG fuel distribution architecture.
Figure 2:
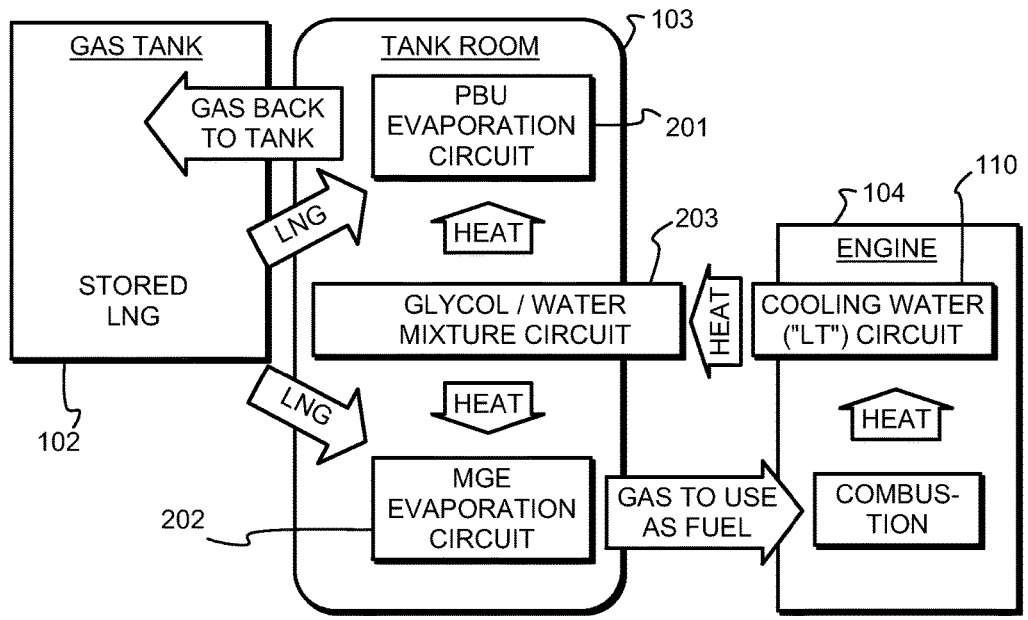
FIG. 2 illustrates heat and material flows in the prior art solution.
Figure 3:
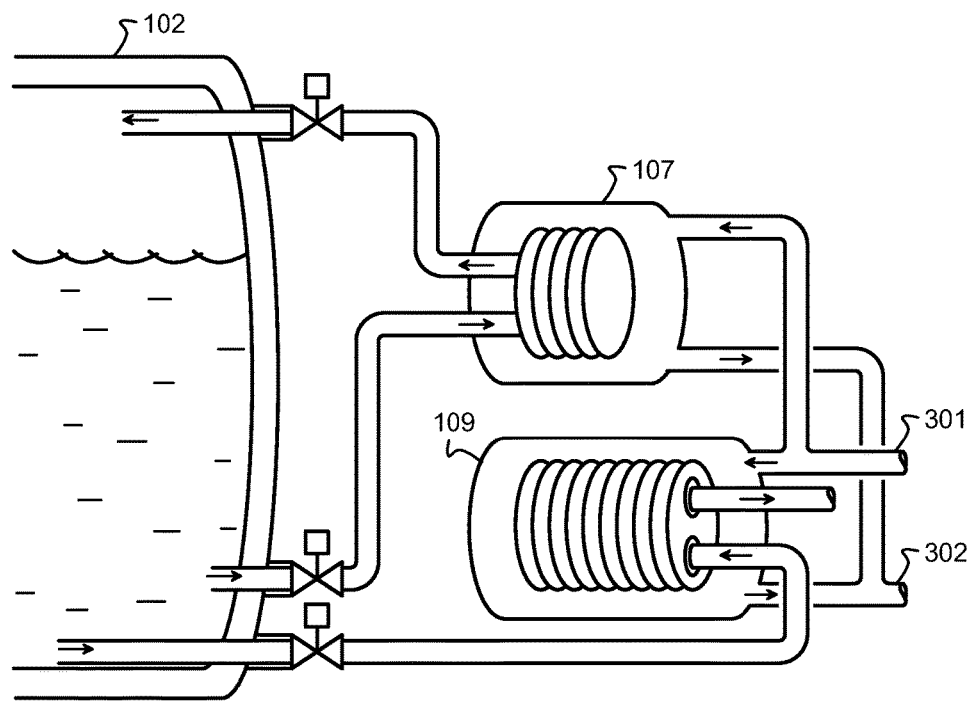
FIG. 3 illustrates parts of a prior art LNG fuel storage and distribution system.
Figure 4:
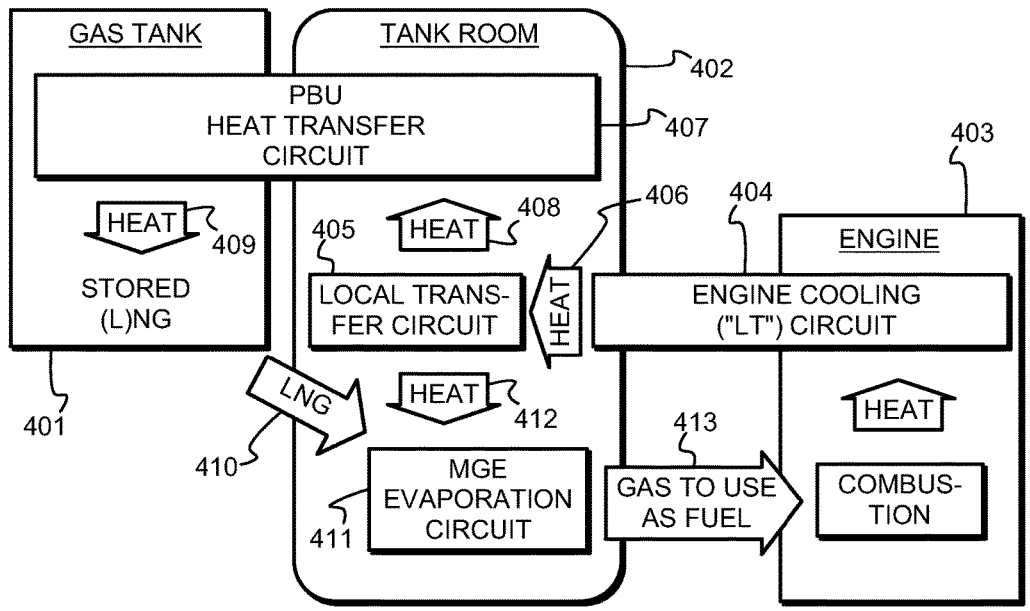
FIG. 4 illustrates heat and material flows in a fuel storage and distribution system according to an embodiment of the invention.

FIG. 4 is a schematic illustration of some heat and material flows in a fuel storage and distribution system for a gas-fuelled sea-going vessel according to an embodiment of the invention. Gas fuel is stored in a thermally insulated gas tank 401 principally in liquefied form. In order to maintain a sufficient internal pressure of the gas tank 401, and also as a mere consequence of natural evaporation, some of the gas fuel inside the gas tank 401 is always in gaseous phase, for which reason we may write the L for liquefied in parentheses in FIG. 4. Attached to or adjacent to the gas tank 401 is a tank room 402, which constitutes a gastight space enclosing tank connections and valves associated with them.

Block 403 represents an engine of the sea-going vessel. The engine 403 is at least partly gas-fuelled, which means that it uses at least gaseous fuel but may also accept liquid fuel such as fuel oil. Combustion, i.e. burning fuel, as well as friction between moving parts create heat within the engine 403. In order to transport excess heat away the engine 403 comprises one or more cooling circuits. As an example it may comprise a so-called high temperature (HT) cooling circuit for cooling the hottest parts such as cylinder heads, and a so-called low temperature (LT) cooling circuit for cooling other parts such as oil coolers. During operation the temperature of a typical HT cooling circuit is around 100 degrees centigrade, while the temperature of a typical LT cooling circuit may be around 50 degrees centigrade. FIG. 4 shows the LT cooling circuit as an example, but in order to maintain generality we should speak about an engine cooling circuit 404 in general.

A part of the engine cooling circuit 404 reaches into the tank room 402 and thus acts, from the viewpoint of the fuel storage and distribution system, as an external heat source circuit. A local heat transfer circuit 405 is configured to extract heat, as illustrated with arrow 406, from that part of the engine cooling circuit 404 that is in the tank room 402. As a part of the local heat transfer circuit 405 is a heating arrangement that is configured to heat gas fuel for increasing pressure inside the gas tank 401. This heating of the gas fuel may take place directly and/or indirectly.

The upper part of FIG. 4 illustrates an indirect implementation of said heating of the gas fuel for increasing pressure (or maintaining an appropriate pressure) in the gas tank 401. The indirect transfer of heat takes place through a pressure build-up (PBU) heat transfer circuit 407 that constitutes a closed loop that allows fluid heating medium contained in the PBU heat transfer circuit 407 to circulate between the tank room 402 and the gas tank 401. Arrow 408 represents the transfer of heat from the local heat transfer circuit 405 to the PBU heat transfer circuit 407, and arrow 409 represents the transfer of heat from the PBU heat transfer circuit 407 to the liquid and/or gaseous phase of the gas fuel contained in the gas tank 401.

The lower part of FIG. 4 illustrates evaporating liquefied gas fuel drawn from the gas tank 401 for delivery to the engine 403 of the sea-going vessel. This is an example of a direct implementation of heating gas fuel by the local heat transfer circuit. As is shown with arrow 410, liquid gas fuel flows from the gas tank 401 to a main gas evaporator (MGE) evaporation circuit 411, the essential parts of which are located in the tank room 402. The local heat transfer circuit 405 donates heat (as shown by arrow 412) to the liquid gas fuel in the MGE evaporation circuit 411, causing a phase transformation into gaseous form. Arrow 413 represents the flow of gaseous fuel to the engine 403.

Figure 5:
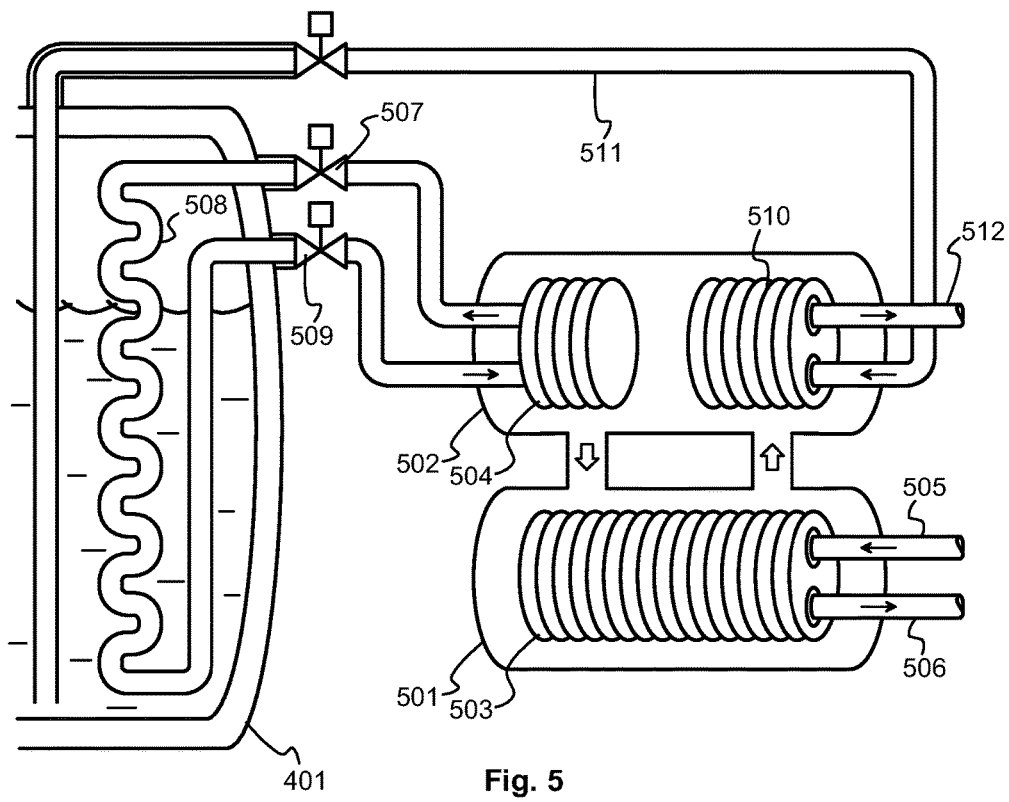
FIG. 5 illustrates parts of a fuel storage and distribution system that follows the principles shown in FIG. 4.

FIG. 5 illustrates schematically one possible practical implementation of the principle explained above with reference to FIG. 4. The local heat transfer circuit comprises a local heat transfer re-boiler 501, and a local heat transfer condenser 502 in fluid connection with it. The fluid connection allows fluid (i.e. gaseous or liquid) transfer medium (not separately shown) to flow between the local heat transfer re-boiler 501 and the local heat transfer condenser 502. A part of the engine cooling circuit that reaches into the tank room constitutes a hot element 503 within the local heat transfer re-boiler 501. A part of the PBU heat transfer circuit constitutes a cold element 504 within the local heat transfer condenser 502.

The references to "hot" and "cold" indicate the purpose of the respective element, and do not necessarily conform to what a human observer would consider hot or cold. A hot element within a re-boiler is that part that during use is meant to donate heat to the transfer medium, causing it to evaporate. A cold element within a condenser is that part that during use is meant to receive heat from the transfer medium, causing it to condense. Heat comes to the hot element 503 from the engine cooling circuit carried by the incoming LT water through pipe 505, and the return path of the LT water towards the engine goes through pipe 506.

In the implementation of FIG. 5 the closed loop of the PBU heat transfer circuit goes from the cold element 504 through a first valve 507 to a heating element 508 located inside the gas tank 401. A return path for the heating medium circulating in the PBU heat transfer circuit comes through a second valve 509 back to the cold element 504. The cold element 504 may act as a re-boiler of said heating medium; in other words, heat received from the transfer medium in the local heat transfer condenser 502 may cause said heating medium to evaporate inside the cold element 504. The heating element 508 may in turn act as a condenser of said heating medium; in other words, the heating medium that flows through the heating element 508 may donate enough heat to the gaseous and/or liquid phase of the stored gas fuel so that the heating medium condenses inside the heating element 508. The valves 507 and 509 control the flow of the heating medium through said closed loop, essentially determining the heating power used to heat the stored gas fuel.

The present invention is not sensitive to the form and location of the heating element 508 inside the gas tank, but certain advantages can be achieved by designing the heating element so that temperature stratification of the stored gas fuel is avoided. Temperature stratification means the forming of horizontal layers that have different temperatures. If nothing is done to prevent it, especially in stabile conditions (like at port, or when proceeding along a protected waterway) a situation may arise in which a cushion of superheated gas appears at the top of the gas tank, causing a relatively high internal pressure reading. Deeper layers of the liquid phase may have temperatures well below the saturation limit. If a sudden movement then causes the contents of the gas tank to splash, the previously superheated gaseous phase may experience rapid cooling, causing the internal pressure to collapse quickly. Rapid fluctuations in the internal pressure of the gas tank make it difficult to maintain a smooth flow of gaseous fuel to the engines.

A heating element that reaches from the top to the bottom of the gas tank, as is schematically shown in FIG. 5, allows heating both the gaseous and liquid phases of the stored gas fuel. This way a majority of the liquid phase can be kept at or close to saturation conditions, while heating the gaseous phase takes care of maintaining the sufficient internal pressure. It would also be possible to provide the PBU heat transfer circuit with two or more loops through the gas tank, each with its own heating element inside the gas tank and each with its own control valves. For example, one heating element could be relatively low in the gas tank for heating the liquid phase towards saturation, while another heating element could be relatively high in the gas tank for heating the gaseous phase with the purpose of maintaining pressure.

Another detail that is schematically shown in FIG. 5 is the avoidance of bottom-level connections to the extremely cold liquefied gas inside the gas tank. Any pipe in which a leak or break could lead to liquefied gas fuel flowing into wrong places is a potential safety hazard. The use of a closed-loop PBU heat transfer circuit means that even if a leak occurs in the pipe, what comes out is (the relatively small amount of) the heating medium, not the whole contents of the gas tank. This advantage would be achieved even if the return pipe from the heating element 508 would come through a lead-through in the lower part of the gas tank 401. The last-mentioned solution might allow an easier path for the condensed heating medium to flow back to the tank room side. In the implementation shown in FIG. 5, where all lead-throughs are in the upper part of the gas tank 401, careful dimensioning is needed to ensure that a siphon effect draws the condensed heating medium out of the heating element 508 under all circumstances.

For evaporating liquefied gas fuel drawn from the gas tank 401, and for providing an engine of the sea-going vessel with gaseous fuel, the fuel storage and distribution system illustrated in FIG. 5 comprises an MGE or main gas evaporator. A part of the MGE constitutes another cold element 510 that is located within the same local heat transfer condenser 502 as the cold element 504 that is a part of the PBU heat transfer circuit. A feed pipe 511 allows liquid gas fuel to flow from the gas tank 401 to the MGE, and an output pipe 512 conducts the evaporated gaseous fuel towards the engine (not shown). It would be possible to place the cold element 504 that is part of the PBU heat transfer circuit and the cold element 510 that is part of the MGE in separate local heat transfer condensers. It would even be possible to provide two different local heat transfer circuits, so that the pipes 505 and 506 would branch into two separate local heat transfer re-boilers, each equipped with its own local heat transfer condenser for the cold elements 504 and 510 respectively.

Figure 6:
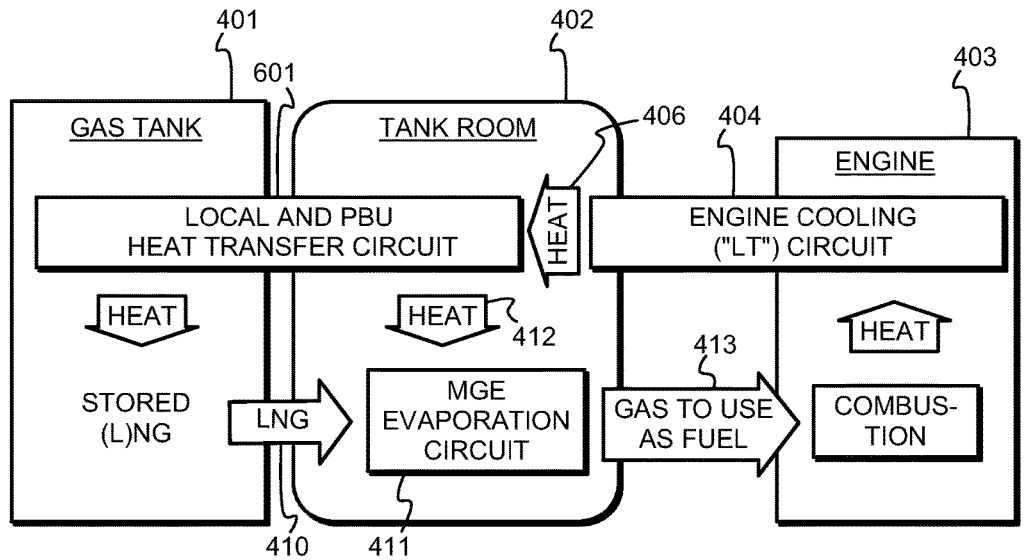
FIG. 6 illustrates heat and material flows in a fuel storage and distribution system according to an embodiment of the invention.
Figure 7:
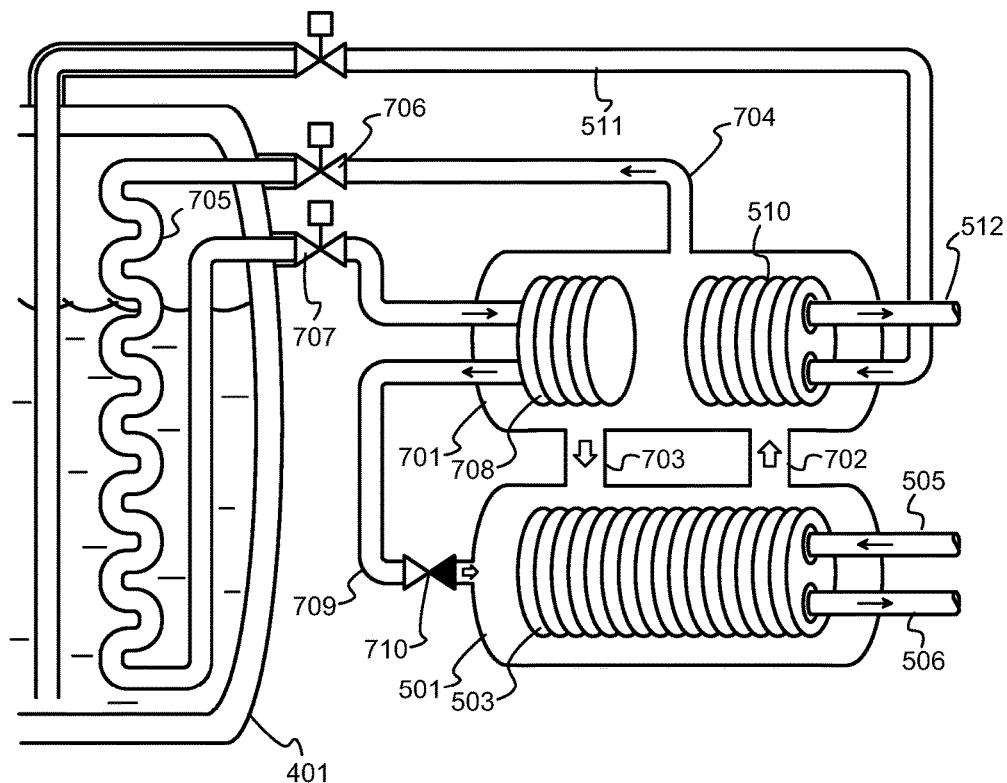
FIG. 7 illustrates parts of a fuel storage and distribution system that follows the principles shown in FIG. 6.

In the system of FIGS. 4 and 5 the local heat transfer circuit transfers heat to the liquefied gas fuel directly in the MGE evaporation circuit and indirectly through the PBU heat transfer circuit. FIGS. 6 and 7 illustrate an alternative approach, in which both of said two heat transfers take place directly. Parts of the illustrated system that may be the same as the corresponding parts in FIG. 4 are the gas tank 401, the tank room 402, the engine 403, the engine cooling circuit 404, and the MGE evaporation circuit 411. Also the flow 410 of LNG from the gas tank 401 to the MGE evaporation circuit, as well as the flows 406 and 412 of heat from the engine cooling circuit 404 to the local heat transfer circuit and further to the MGE evaporation circuit 411 may also take place in a similar way as in FIG. 4. As a difference to the approach of FIG. 4, there is no separate PBU heat transfer circuit, but the local heat transfer circuit takes a similar role. For this purpose the circuit 601 is called the local and PBU heat transfer circuit 601 in FIG. 6.

FIG. 7 illustrates one possible practical implementation of the principle shown in FIG. 6. Parts that are essentially the same as in FIG. 5 have the same reference designators: for example the local heat transfer circuit comprises a local heat transfer re-boiler 501, and a part of the engine cooling circuit that reaches into the tank room constitutes a hot element 503 within the local heat transfer re-boiler 501. As a difference to FIG. 5, although the local heat transfer condenser is in fluid connection with the local heat transfer re-boiler 501, it comprises more than just an adjacent condenser chamber 701. The local heat transfer condenser extends at least partly into the gas tank 401 that is located adjacent to the tank room.

A forward path 702 exists for evaporated transfer medium to flow from the local heat transfer re-boiler 501 to the condenser chamber 701. A direct return path 703 is available, through which condensed transfer medium may return from the condenser chamber 701 to the local heat transfer re-boiler 501. However, not all evaporated transfer medium condenses immediately in the condenser chamber 701. A pipe 704 constitutes another forward path for some of the evaporated transfer medium to flow further from the condenser chamber 701 to the external condenser element 705, which is located in the gas tank 401. Valves 706 and 707 are provided for controlling the flow of transfer medium in the loop extending to the gas tank 401, which loop comprises the external condenser element 705.

The return path for (condensed) transfer medium from said loop comes through valve 707 to a cold element 708 located in the condenser chamber 701. For reasons that become more apparent below, we may call this the first return path. Namely, from the cold element 708 a second return path 709 exists for transfer medium to flow from the cold element 708 to the local heat transfer re-boiler 501. A check valve 710 or some corresponding one-way flow device may be provided along said second return path in order to ensure that evaporated transfer medium cannot flow from the local heat transfer re-boiler 501 upstream to the cold element 708.

The cold element 708 acts as a preheater that ensures that the transfer medium is not too cold when it enters the local heat transfer re-boiler 501. The temperature of the condensed transfer medium that flows out of the external condenser element 705 may be close to that of liquefied natural gas that is stored in a pressure of the order of a couple of bars. On the other hand, the liquid that circulates inside the hot element 503 may come from the engine cooling circuit, and may be (mostly) water. If the extremely cold transfer medium flowing out of the external condenser element 705 would be allowed to come into contact with the hot element 503 immediately, it could cause freezing. Therefore it is advisable to take the transfer medium through a preheater, which in this case is the cold element 708 within the condenser chamber 701.

The second return path 709 and the check valve 710 could also be omitted, so that preheated transfer medium could flow out of the cold element 708 simply into the surrounding condenser chamber 701, from which it would return through the direct return path 703 to the local heat transfer re-boiler 501.

In a way that is similar as such to the implementation in FIG. 5, the fuel storage and distribution system of FIG. 7 comprises a main gas evaporator, a part of which constitutes a cold element 510 within the local heat transfer condenser (here: within the condenser chamber 701). The pipes 511 and 512 associated with the MGE are the same as in FIG. 5.

Figure 8:
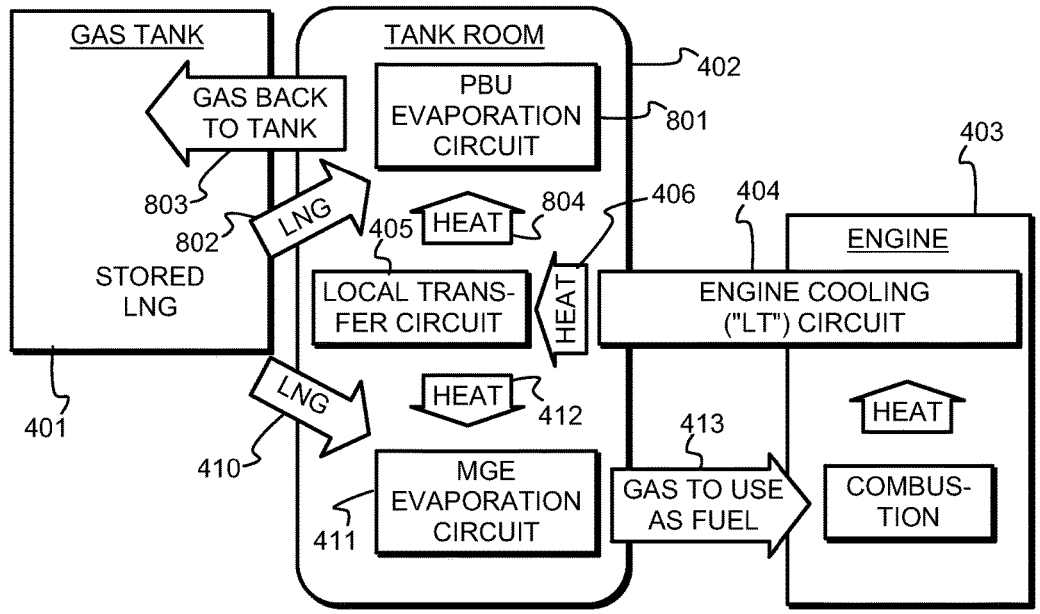
FIG. 8 illustrates heat and material flows in a fuel storage and distribution system according to an embodiment of the invention.
Figure 9:
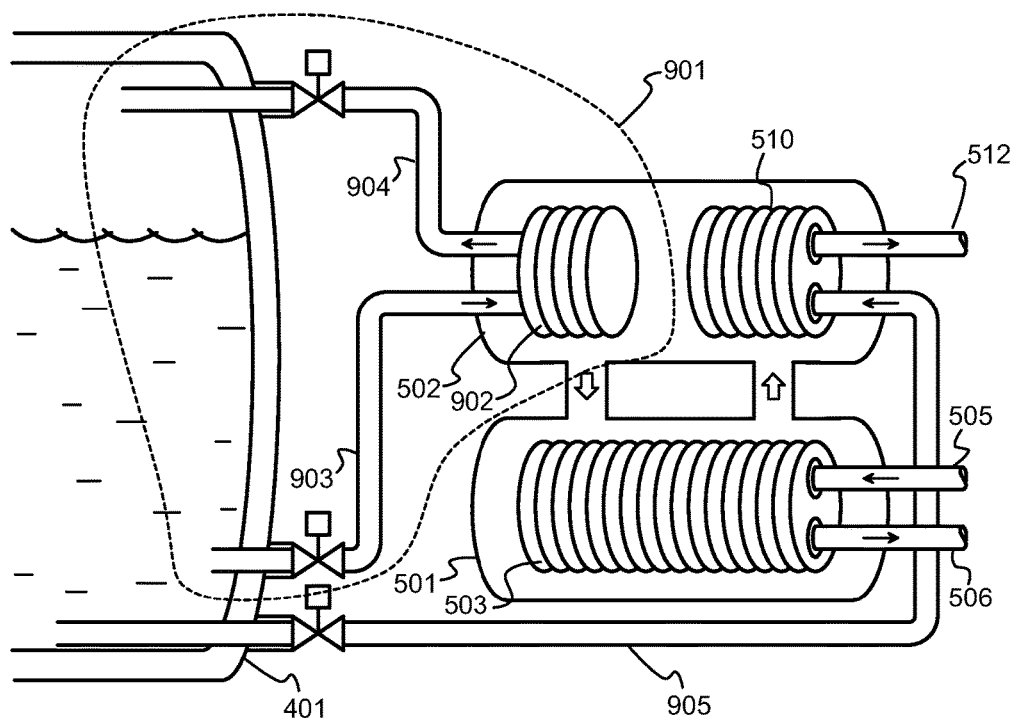
FIG. 9 illustrates parts of a fuel storage and distribution system that follows the principles shown in FIG. 8.

Not all embodiments of the invention need to be associated with a heating element inside the gas tank for maintaining tank pressure, although using one enables achieving certain particular advantages. The feature of heating gas fuel for increasing pressure inside the gas tank may be fulfilled completely with gas fuel handled inside the tank room. FIGS. 8 and 9 illustrate parts and heat flows of a fuel storage and distribution system in which the tank pressure is maintained by circulating gas fuel from the gas tank through an external pressure build-up evaporation circuit. Parts of the drawings that carry significant resemblance to corresponding parts in the previous drawings have the same reference designators.

As a difference to FIGS. 4 and 6, a PBU evaporation circuit 801 (and not a PBU heat transfer circuit, like in FIGS. 4 and 6) is located in the tank room 402. LNG flows from the gas tank 401 to the PBU evaporation circuit 801 according to arrow 802, and gas fuel in the gaseous phase flows from the PBU evaporation circuit 801 back to the gas tank 401 according to arrow 803. Heat for evaporating the LNG in the PBU evaporation circuit 801 comes from the local heat transfer circuit 405 according to arrow 804.

FIG. 9 shows one possible practical implementation of the principle illustrated in FIG. 8. The local heat transfer circuit comprises a local heat transfer re-boiler 501 and a local heat transfer condenser 502 in fluid connection therewith, like in the embodiment described earlier with reference to FIG. 5. A part of the engine cooling circuit that reaches into the tank room constitutes a hot element 503 within the local heat transfer re-boiler 501. The fuel storage and distribution system comprises a pressure build-up loop 901 with a pressure build-up evaporator 902. Liquefied gas fuel, which is stored in the gas tank 401 adjacent to the tank room, is drawn to the pressure build-up evaporator 902 through a pipe 903, and gas fuel in gaseous phase is blown from the pressure build-up evaporator 902 back to the gas tank 401 through another pipe 904. The pressure buildup evaporator 902 constitutes a cold element within the local heat transfer condenser 502.

The MGE evaporation circuit that appears as block 411 in FIG. 8 is also schematically shown in FIG. 9. Its purpose is to evaporate liquefied gas fuel drawn from the gas tank 401 through pipe 905, and to deliver the gas fuel in gaseous phase towards one or more engines of the sea-going vessel through pipe 512. A part of the MGE evaporation circuit constitutes a cold element 510 within the same local heat transfer condenser 502 as the pressure build-up evaporator 902.

FIG. 9 also illustrates the possibility of having the inlets of pipes 903 and 905 so low inside the gas tank 401 that they are practically always below the surface of the liquid phase, and drawing the pipes to the tank room so that the hydrostatic pressure of the liquefied gas fuel is the main force that makes LNG flow to the evaporators (the heat exchangers/evaporators illustrated in the right part of FIG. 9 may be considerably lower in a practical implementation). Previously it was pointed out that lead-throughs in the lower part of the gas tank, and pipes coming through such lead-throughs where LNG flows may constitute a risk of extremely cold LNG flooding through a possible leak or break. However, such risks can be kept at an acceptable level by using appropriate materials and structural solutions. Utilizing the hydrostatic pressure of the LNG involves in any case the advantage of not having to rely on a siphon effect (which may malfunction e.g. as a consequence of LNG sloshing in high seas) and not requiring a pump (pumps that can withstand continuous operation at cryogenic temperatures are relatively expensive).

Figure 10:
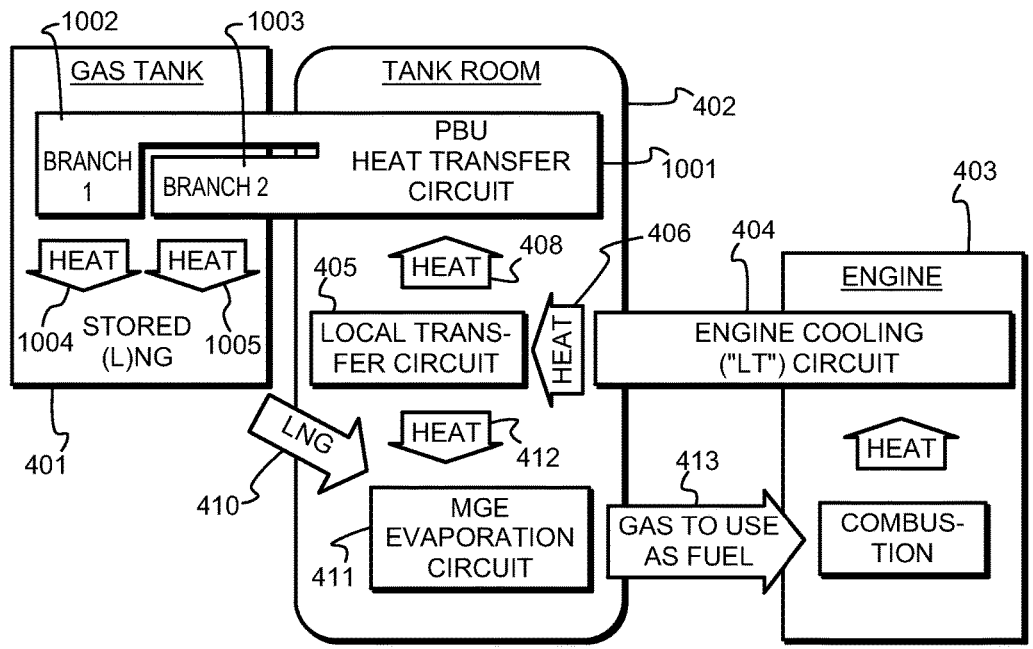
FIG. 10 illustrates heat and material flows in a fuel storage and distribution system according to an embodiment of the invention.

FIG. 10 illustrates an embodiment of the invention in which the local heat transfer circuit 405 donates heat to a PBU heat transfer circuit 1001 within the tank room 402, and the PBU heat transfer circuit 1001 branches into a first branch 1002 and a second branch 1003 that reach from the tank room 402 to the gas tank 401. Both the first branch 1002 and the second branch 1003 donate heat to the gas fuel inside the gas tank 401 according to arrows 1004 and 1005 respectively, but this may take place at different locations inside the gas tank 401 and in different ways.

Figure 11:
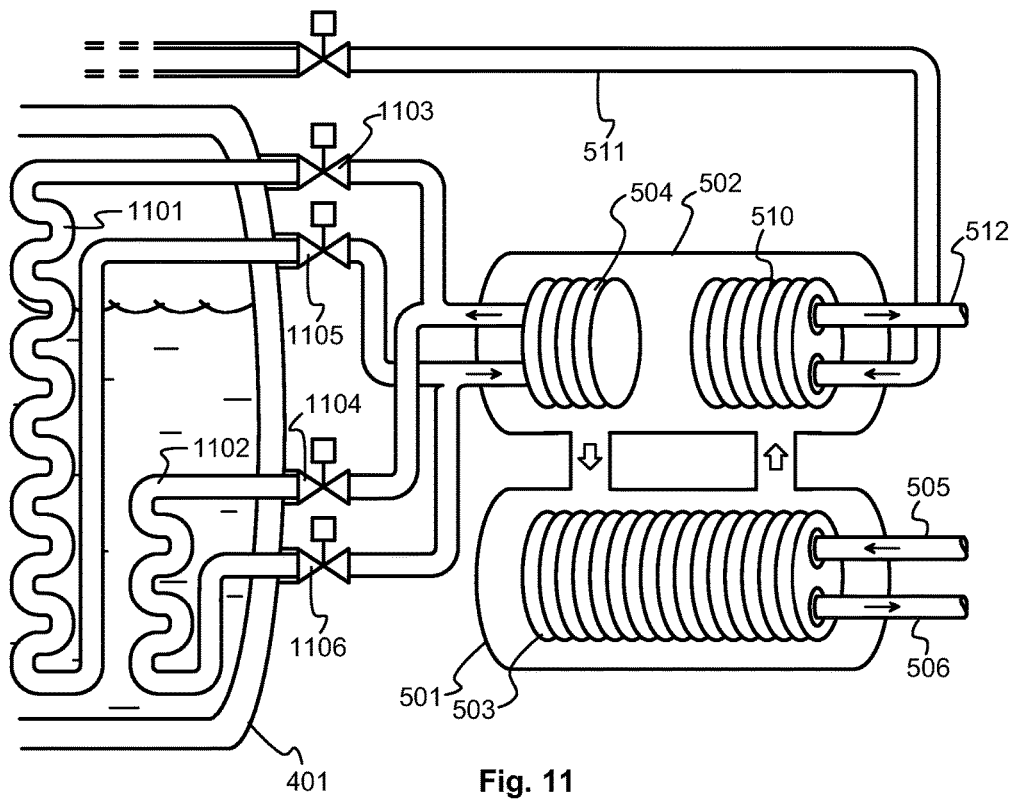
FIG. 11 illustrates parts of a fuel storage and distribution system that follows the principles shown in FIG. 10.

FIG. 11 shows one possible practical implementation of the principle illustrated in FIG. 10. A part of the PBU heat transfer circuit constitutes a cold element 504 within the local heat transfer condenser 502. Inside the gas tank 401 are a first heating element 1101 and a second heating element 1102, to which the fluid heating medium may flow from the cold element 504 through controllable valves 1103 and 1104 respectively. Return valves 1105 and 1106 allow the fluid heating medium to return from the first and second heating elements 1101 and 1102 back to the cold element 504. The feed pipe 511 is shown only schematically at the top of FIG. 11; it will come from inside the gas tank 401 but in which way is of no importance here.

The first heating element 1101 is constructed and located so that it can donate heat both to the gaseous phase and to the liquid phase of the gas fuel inside the gas tank 401. In other words one part of the first heating element 1101 is at the top of the gas tank 401, where the gaseous phase will appear, and another part of the first heating element 1101 is at the bottom of the gas tank 401, where the liquid phase will appear. The first heating element 1101 may even extend in an essentially similar way across a major part of the internal height of the gas tank 401. The second heating element 1102 is constructed and located so that it will donate heat mainly to only one of the gaseous and liquid phases of the gas fuel inside the gas tank. In the embodiment of FIG. 11 the second heating element 1102 is located close to the bottom of the gas tank 401, so it will mainly donate heat to the liquid phase.

It should be noted that the location of pipe inlets inside the gas tank, and the routes through which pipes are drawn, are of little significance to the present invention. The possibilities that are schematically shown in FIGS. 5, 7, 9, and 11 can be combined with each other in various ways. Similarly the various ways of constructing the PBU heat transfer circuit, if one is used, like those illustrated in FIGS. 5 and 7, can also be combined with other features of e.g. the embodiment of FIG. 11 in various ways.

Figure 12:
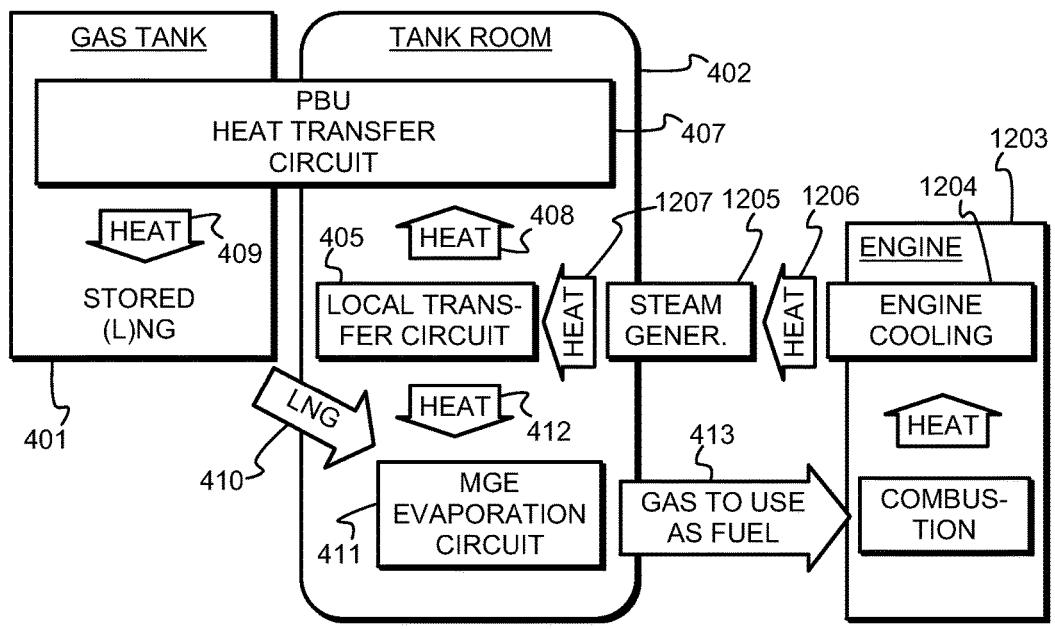
FIG. 12 illustrates heat and material flows in a fuel storage and distribution system according to an embodiment of the invention.

FIG. 12 illustrates the possibility of using some other external heat source circuit than any of the actual engine cooling circuits. In order to achieve the savings in components and construction that is offered by omitting the previously needed glycol/water mixture circuit, it is advantageous to utilize circuits that already exist due to the general construction of the vessel. In the embodiment of FIG. 12 the engine 1203 comprises a cooling circuit 1204, but no part of it reaches directly to the tank room 402. Waste heat from the engine 1203 is transferred to a steam generation circuit 1205 according to arrow 1206. A part of the steam generation circuit 1205 reaches into the tank room 402, where the local heat transfer circuit 405 extracts heat from it according to arrow 1207.

Another possible form of external heat source circuit is a circuit that contains heat from some part of the HVAC (heating, ventilation, and air conditioning) system of the vessel. A large sea-going vessel may also contain other power machines than its primary engines, which power machines need to be cooled so that the heat flowing in to the corresponding cooling arrangement is available for use as an external heat source circuit for a fuel storage and distribution system according to an embodiment of the invention. Yet another possible form of external heat source circuit is a thermal oil circuit, a part of which reaches into the tank room.

Figure 13:
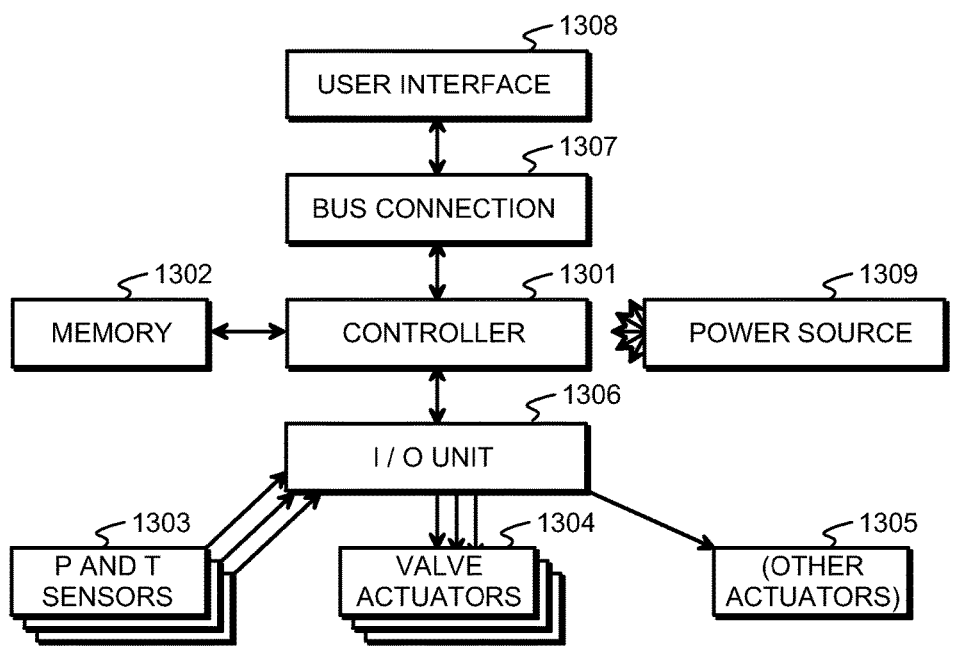
FIG. 13 illustrates schematically a control architecture of a fuel storage and distribution system according to an embodiment of the invention.

FIG. 13 illustrates schematically an arrangement for controlling the fuel storage and distribution system. The central element in such controlling is a controller 1301, which may be for example a microprocessor. Computer-readable instructions are stored in a non-volatile memory 1302 and, when executed by the controller 1301, cause the implementation of a method according to an embodiment of the invention. The method comprises transferring heat from an engine cooling circuit, which reaches into a tank room, to a local heat transfer circuit in said tank room, and using said local heat transfer circuit to heat liquefied gas fuel handled in said fuel storage and distribution system. The local heat transfer circuit may be used to heat fluid heating medium that circulates in a closed loop through the gas tank, or contents of the local heat transfer circuit can be circulated in a closed loop through the gas tank. The contents of the local heat transfer circuit can be evaporated with heat received from the engine cooling circuit and condensed, so that said condensing donates heat to the gas fuel.

The pressures that prevail at various locations in the fuel storage and distribution system can be measured with a number of suitably located pressure sensors 1303. Typical action to be taken to physically control the pressure would involve opening and/or closing some valves that control the flows of gaseous and liquid media, for which purpose there are a number of appropriately placed actuators 1304. It is also possible that the system comprises other actuators 1305 or controllable devices, for example controllable a pump or a heater that is used to control the temperature of some critical part of the arrangement.

The pressure sensors 1303, the actuators 1304 and the possible other actuators 1305 may be commonly designated as the physical action devices. An input and output unit (I/O unit) 1306 serves as an interface between the controller 1301 and the physical action devices. It exchanges information in digital form with the controller 1301, receives measurement signals in the form of voltages and/or currents from the pressure sensors 1303, and transmits commands in the form of voltages and/or currents to the actuators 1304 and 1305. The input and output unit 1306 also makes the necessary conversions between the digital representations it uses in communicating with the controller 1301 and the (typically, but not necessarily) analog voltage and/or current levels it uses in controlling the physical action devices.

A bus connection 1307 links the controller 1301 with one or more user interfaces 1308, which may be located for example in an engine control room and/or on the bridge of the sea-going vessel. A user interface typically comprises one or more displays and some user input means, such as a touch-sensitive display, a keyboard, a joystick, a roller mouse, or the like. The display part of the user interface is used to display to a human user information about the state and operation of the fuel storage and distribution system. The input means of the user interface are available for the user to give commands that control the operation of the gaseous fuel storage and distribution arrangement.

A power source arrangement 1309 derives and distributes the necessary operating voltages for the various electrically operated parts of the control arrangement.

Variations and modifications to the embodiments explained above are possible without parting from the scope of the appended claims. One distinctive class of variations involves varying the number of separate re-boilers and/or condensers included in the local heat transfer circuit: although only some relatively simple embodiments have been discussed with a somewhat minimal number of local heat transfer re-boilers and local heat transfer condensers, it is relatively straightforward to present embodiments in which there are two or more of any of them. Another distinctive class of variations involves the mechanisms of heat transfer. Previously it was pointed out that evaporation and condensation involve e.g. certain natural efficiency, which can be seen as a relatively small physical footprint of the required devices inside the tank room. However, basically nothing would preclude the local heat transfer circuit from being based on a liquid transfer medium.

Yet another distinctive class of variations involves the structural appearance of the hot and cold elements in relation to the circulation of engine cooling water, the transfer medium in the local heat transfer circuit, and the heating medium in the possible PBU heat transfer circuit. FIGS. 5, 7, and 9 consistently show e.g. the hot element 503 as being located inside a chamber that constitutes the local heat transfer re-boiler 501. Graphical representations have been selected only to make it easier to follow the description. For example, the hot element that forms a part of the engine cooling circuit could well take the form of an outer jacket, inside which is a meandering pipe that acts as a local heat transfer re-boiler. The term "within" used in the description should be read like "in association with" or "as a part of", rather than being literally interpreted as meaning "inside".

The invention claimed is:

1. A fuel storage and distribution system for a gas-fueled sea-going vessel, comprising:
 a thermally insulated gas tank for storing liquefied gas fuel and
 a tank room,
 an external heat source circuit comprising at least one of the following: a part of an engine cooling circuit reaching into said tank room, a part of a steam generation circuit reaching into said tank room, or a part of a thermal oil circuit reaching into said tank room, wherein the fuel storage and distribution system further comprises:
 a local heat transfer circuit in the tank room, which local heat transfer circuit comprises a local heat transfer re-boiler, and a local heat transfer condenser in fluid connection with said local heat transfer re-boiler, configured to extract heat from an external heat source circuit, which external heat source circuit constitutes a hot element within local heat transfer re-boiler, which hot element is a part that during use donates heat to a transfer medium of said local heat transfer circuit, causing it to evaporate within said local heat transfer re-boiler, which local heat transfer condenser extends at least partly into said gas tank,
 the tank room constitutes a gastight space enclosing tank connections and valves associated with them, and
 the local heat transfer circuit is configured to extract heat from said external heat source circuit inside said tank room,
 as a part of said local heat transfer circuit a heating arrangement configured to heat liquefied gas fuel, which is stored in said gas tank, for increasing pressure inside said gas tank indirectly through a pressure build-up heat transfer circuit that constitutes a closed loop that allows fluid heating medium to circulate between the tank room and the gas tank, wherein a part of said pressure build-up heat transfer circuit constitutes a cold element, which is a part that during use receives heat from the transfer medium causing it to condense, within said local heat transfer condenser, or directly by making heated, fluid transfer medium of said local heat transfer circuit donate heat to said liquefied gas fuel, and
 as a part of said local heat transfer circuit a main gas evaporator for evaporating liquefied gas fuel drawn from said gas tank for delivery to an engine of the sea-going vessel.

2. The fuel storage and distribution system according to claim 1, wherein:
 a part of said main gas evaporator constitutes a cold element within the same local heat transfer condenser as said part of the pressure build-up heat transfer circuit.

3. The fuel storage and distribution system according to claim 1, wherein said local heat transfer condenser comprises:
 a condenser chamber and a forward path for evaporated transfer medium from said local heat transfer re-boiler to said condenser chamber, and
 an external condenser element and a forward path for evaporated transfer medium from said condenser chamber to said external condenser element;
 wherein said external condenser element is comprised in a loop extending into said gas tank.

4. The fuel storage and distribution system according to claim 3, comprising:
 a cold element, which is a part that during use receives heat from the transfer medium causing it to condense, within said condenser chamber,
 a first return path for transfer medium from said loop to said cold element, and
 a second return path for transfer medium from said cold element to said local heat transfer re-boiler.

5. The fuel storage and distribution system according to claim 1, wherein a part of said main gas evaporator constitutes a cold element within the local heat transfer condenser.

6. The fuel storage and distribution system according to claim 1, wherein the fuel storage and distribution system comprises a pressure build-up loop with a pressure build-up evaporator, for drawing liquefied gas fuel from said gas tank to said pressure build-up evaporator and for blowing gas fuel in gaseous phase from said pressure build-up evaporator back to said gas tank, and said pressure build-up evaporator constitutes a cold element, which is a part that during use receives heat from the transfer medium causing it to condense, within said local heat transfer condenser.

7. The fuel storage and distribution system according to claim 6, wherein a part of said main gas evaporator constitutes a cold element, which is a part that during use receives heat from the transfer medium, causing it to condense, within the same local heat transfer condenser as said pressure build-up evaporator.

8. A method for maintaining pressure in a gas tank of a fuel storage and distribution system according to claim 1, for a gas-fueled sea-going vessel, comprising:

extracting heat from an external heat source circuit to a local heat transfer circuit, using said local heat transfer circuit to heat gas fuel for increasing pressure inside said gas tank, and using said local heat transfer circuit to evaporate liquefied gas fuel drawn from said gas tank for delivery to an engine of the sea-going vessel, wherein contents of said local heat transfer circuit are evaporated with heat extracted from the external heat source circuit and condensed, wherein said condensing donates heat to said gas fuel.

9. The method according to claim 8, wherein said local heat transfer circuit is used to heat fluid heating medium that circulates in a closed loop through said gas tank.

10. The method according to claim 8, wherein contents of said local heat transfer circuit are circulated in a closed loop through said gas tank.

\* \* \* \* \*